US006452376B1

(12) United States Patent
Marguinaud et al.

(10) Patent No.: US 6,452,376 B1
(45) Date of Patent: Sep. 17, 2002

(54) METHOD OF ESTIMATING THE CARRIER FREQUENCY OF A PHASE-MODULATED DIGITAL SIGNAL

(75) Inventors: André Marguinaud, Palaiseau; Pierre Bertrand, Antibes, both of (FR)

(73) Assignee: Alcatel, Paris (FR)

( * ) Notice: Subject to any disclaimer, the term of this patent is extended or adjusted under 35 U.S.C. 154(b) by 15 days.

(21) Appl. No.: 09/714,167

(22) Filed: Nov. 17, 2000

(30) Foreign Application Priority Data

Nov. 18, 1999 (FR) ............................................ 99 14493

(51) Int. Cl.$^7$ ............................................. G01R 23/16
(52) U.S. Cl. .................................................... 324/76.21
(58) Field of Search .......................... 324/76.21, 76.24, 324/76.31, 76.38; 329/302, 304, 307; 375/268, 269, 279, 285; 342/192, 194, 195

(56) References Cited

U.S. PATENT DOCUMENTS

| | | | |
|---|---|---|---|
| 4,904,930 A | * | 2/1990 | Nicholas ................... 324/77 E |
| 4,912,422 A | * | 3/1990 | Kobayashi et al. .......... 329/306 |
| 5,077,531 A | * | 12/1991 | Takeuchi et al. ............ 329/304 |
| 5,886,913 A | * | 3/1999 | Marguinaud et al. . 364/724.011 |
| 6,061,606 A | * | 5/2000 | Ross ........................... 700/121 |
| 6,185,257 B1 | * | 2/2001 | Moulsley .................... 375/260 |

FOREIGN PATENT DOCUMENTS

EP          0 556 807 A2     8/1993

OTHER PUBLICATIONS

Palmer, L. C. et al.: "Synchronization for QPSK Transmission via Communications Satellites" IEEE Transactions on Communications, vol. COM–28, No. 8, Aug. 1980, pp. 1302–1314, XP000758589, New York, ISSN: 0090–6778.
Fujino, T. et al: "Self–Noise Produced by Quadrupling of QPSK Signals" IEEE Transactions on Aerospace and Electronic Systems, vol. 18, No. 5, Sep. 1982, pp. 701–704, XP000760770, New York, ISSN: 0018–9251.
Thao, S. et al: "Carrier Frequency Estimation in Satellite Communications" IEEE VTS 50$^{th}$ Vehicular Technology Conference, vol. 5, Sep. 19, 1999, pp. 2765–2769, XP002144112.

* cited by examiner

*Primary Examiner*—N. Le
*Assistant Examiner*—Etienne P LeRoux
(74) *Attorney, Agent, or Firm*—Sughrue Mion, PLLC

(57) ABSTRACT

A phase-modulated digital signal has N states representing N symbols. The carrier frequency of the signal is estimated through filtering, multiplication of the phase by N, computation of a Fourier transform of the result, and finding the frequency at which the Fourier transform is at a maximum. The frequency can be found by determining the maximum value of the square of the modulus of the Fourier transform and the value of the frequency for which the derivative is zero.

8 Claims, 1 Drawing Sheet

METHOD OF ESTIMATING THE CARRIER FREQUENCY OF A PHASE-MODULATED DIGITAL SIGNAL

The invention relates to a method of estimating the carrier frequency of a phase-modulated signal.

BACKGROUND OF THE INVENTION

Digital radio transmissions usually employ phase modulation. Phase-modulated transmission consists of transmitting a sinusoidal carrier, for example of constant amplitude, with a particular angular frequency $\omega_0$ and applying to that carrier in each symbol period a phase shift that depends on the value of the symbol to be transmitted. If the symbol to be transmitted is a binary digit 0 or 1, the phase shift can take only two values, for example 0 or $\pi$ radians. If the symbol is a two-digit binary number, the phase shift can take four values, for example 0, $\pi/2$, $\pi$ and $3\pi/2$ radians. The zero phase shift corresponds to the symbol 00, for example, the phase shift of $\pi/2$ radians corresponds to the symbol 01, the phase shift of $\pi$ radians corresponds to the symbol 10, and the phase shift of $3\pi/2$ radians corresponds to the symbol 11. Phase modulation of this kind is often referred to as M-PSK modulation, where PSK denotes "phase shift keying" and M is the total number of phases.

When the phase-modulated signal is received, the receiver determines the values of the phase shifts in order to determine the values of the symbols. To determine the phase shifts, i.e. the information part of the received signal, the receiver (modem) must know other parameters of the signal, namely its amplitude, frequency, and original phase.

The received signal is generally expressed by the complex number Z having the following value:

$$Z(t) = A e^{j(\omega_0 t + \varphi_0 + m\frac{\pi}{2})} \quad (1)$$

In the above equation, t is time, A is the amplitude of the carrier, $\omega_0 = 2\pi f_0$ is the angular frequency of the carrier, $\psi_0$ is an original phase shift and m is an integer which represents the symbol. In the above example, m can take the values 0, 1, 2 and 3 and those values respectively correspond to the symbols 00, 01, 10 and 11.

i is the imaginary number such that:

$$j^2 = -1 \quad (2)$$

If the values A (amplitude), $\psi_0$ (initial phase) and $\omega_0$ are known, the number m can easily be deduced. All that is required is to multiply Z(t) by:

$$\frac{1}{A} e^{-j(\varphi_0 + \omega_0 t)} \quad (3)$$

This yields $$Z(t) \cdot \frac{1}{A} e^{-j(\varphi_0 + \omega_0 t)} = e^{jm\frac{\pi}{2}} \quad (4)$$

The receiver generally has available to it information about the expected carrier frequency. However, the carrier frequency often does not have exactly the expected value; this is why it must be possible to estimate it. There are various causes of carrier frequency error: they include the Doppler effect, for example, when the receiver or the transmitter is moving, and inaccuracy of the local clock of the transmitter, which determines the carrier frequency.

A Fourier transform is applied to the received signal to determine the carrier frequency. The Fourier transform provides the spectrum of the received signal, i.e. the curve of signal amplitude variation as a function of frequency. The spectrum theoretically has a center line at the frequency $f_0$ and of high amplitude compared to the remainder of the spectrum. However, because the Fourier transform is computed over a finite period, the line has a finite width. The frequency position of the center line is also inaccurate because of additive noise on the transmission channel and because the measurement is based on sampling.

It is known in the art to use a Nyquist bandpass filter with a relatively wide passband to reduce noise before computing the Fourier transform. In this way the noise which is uniformly distributed across the spectrum is eliminated outside the passband of the Nyquist filter.

Then, before computing the Fourier transform, and in order to obtain a pure carrier, the phase of the received signal Z(t) is multiplied by the number N of symbols, i.e. by 4 in the above example. For this purpose, the signal Z(t) can be raised to the power N, for example. Accordingly, when N=4:

$$\left[\frac{Z(t)}{A}\right]^4 = e^{j(4\omega_0 t + m\frac{4\pi}{2} + 4\varphi_0)} \quad (5)$$
$$= e^{j(4\omega_0 t + 4\varphi_0)}$$

It can therefore be seen that the signal raised to the power N does not depend on m, i.e. it does not depend on the modulating value.

The Fourier transform is then computed from the pure signal, which supplies the value $4\omega_0$. All that then remains is to divide the value obtained by 4.

Despite the presence of the Nyquist filter, this method of estimating the carrier frequency of the receive signal is very sensitive to noise, which constitutes a particularly serious problem for a radiocommunications system, for which there are many sources of interference.

OBJECTS AND SUMMARY OF THE INVENTION

In a first aspect, the invention relates to a method of estimating the carrier frequency which achieves better elimination of noise than the prior art method.

In a second aspect, the invention relates to a method of estimating the carrier frequency which, for a given noise level, supplies a more accurate estimate than the prior art method.

Accordingly, in the first aspect of the invention, the method of estimating the carrier frequency of a phase-modulated digital signal entails Nyquist filtering the received signal, then multiplying the phase of the received signal by the number N of symbols, or by a multiple of that number N, and then computing the Fourier transform of the signal whose phase has been multiplied by N, and after multiplying the phase of the signal by the number N, or by a multiple of N, applying filtering using a bandpass filter whose characteristic has steep flanks and a flat top in the passband and whose passband is substantially equal to the range of uncertainty as to the carrier frequency and centered in that range.

The bandpass filter whose characteristic has steep flanks and a flat top in the passband is preferably a Hermite filter as described in U.S. Pat. No. 5,886,913.

The invention is based on the observation that multiplying the phase by the number N increases the noise significantly, which noise is significantly reduced by the filter whose characteristic has steep flanks. Using a filter whose characteristic has steep flanks produces a passband that is significantly narrower than that obtained with a Nyquist filter and therefore improves noise elimination.

Note that the filter is used after multiplying the phase of the signal by N because, prior to multiplication, since the received signal is not a signal at a pure frequency, filtering narrower than the main half-lobe would distort the signal, whereas after multiplying the phase by N the signal is at a pure frequency and the passband of the filter can be as narrow as is permitted by the range of uncertainty as to the frequency, intersymbol distortion no longer applying.

A Hermite filter has the advantage of requiring a relatively modest quantity of computation.

In a second aspect of the invention, which can be used independently of or in combination with its first aspect, the invention also provides a method of estimating the frequency of a carrier of a phase-modulated digital signal in which the received signal is Nyquist filtered, the phase of the received signal is multiplied by the number N of symbols, or by a multiple thereof, the Fourier transform of the signal whose phase has been multiplied by N, or by a multiple of N, is computed, and the frequency is determined for which the spectrum obtained in this way has a maximum, wherein, to determine the frequency of the maximum of the spectrum, the derivative of that spectrum and the frequency for which that derivative is zero are determined.

The derivative can be obtained by calculating the following quantity:

$$D = Im[FFT(Z_t) \cdot FFT^*(tZ_t)] \quad (6)$$

In the above equation, Im signifies the imaginary part of the quantity between square brackets, $FFT(Z_t)$ signifies the Fourier transform of the sampled signal Z at time t and the second term of the multiplication inside the square brackets is the conjugate value of the Fourier transform of the quantity $tZ_t$. The conjugate value of a complex number a+jb is the complex number a−jb.

In the method known in the art, the peak of the spectrum is determined either by interpolation and treating the variation as parabolic near the peak or by oversampling and taking the highest value of the oversampled spectrum.

During research conducted in the context of the invention, the inventors have found, surprisingly, that for a given complexity, i.e. for a given computation power, better accuracy for $f_0$ is obtained by using the zero crossing of the derivative of the spectrum than by determining the frequency at which the spectrum has a maximum.

Similarly, it has been shown that, for given accuracy and some particular computation power, the computation time using the invention is at most half the computation time of the standard method for determining the peak of the spectrum directly.

Because of this improved accuracy, the method of the invention can estimate the carrier frequency of signals having a lower signal-to-noise ratio than is possible with prior art modems. Thus signals more severely affected by noise can be detected.

The first and second aspects of the invention can also be applied to estimating the carrier frequency of a phase-modulated signal which is also amplitude-modulated. In this case, multiplying the phases by N does not eliminate the modulation completely, but only some of the modulation states; the advantage of this embodiment is that the modulation rate is slowed down and the spectrum of the signal therefore narrowed. In other words, multiplying the phases by N does not in this case provide a pure line, as in pure phase modulation. However, narrowing the signal spectrum helps to improve the accuracy with which the carrier frequency is determined, compared to the case in which it is determined without multiplying the phases by N.

It is true that the improvement in accuracy obtained appears at first sight to be less than in the case of a signal which is only phase-modulated, but as a general rule the signal-to-noise ratio of an amplitude-modulated signal is significantly greater, by more than 10 dB, than the signal-to-noise ratio of phase-modulated signals. Accordingly, compared to a signal which is only phase-modulated, a signal which is both phase-modulated and amplitude-modulated can be subject to higher noise levels.

The invention also provides receivers or modems using the method of the invention.

The invention therefore provides a method of estimating the carrier frequency of a phase-modulated digital signal with N states representing N symbols, which method includes: preliminary filtering of the received signal, multiplying the phase of the received signal by the number N, or a multiple thereof, computing the Fourier transform of the received signal with its phase multiplied N, or by a multiple of N, and determining the frequency for which the Fourier transform is maximum.

According to the invention, after multiplying the phase by N, or by a multiple of N, and before computing the Fourier transform, additional filtering is effected using a filter whose characteristic has steep flanks and a flat top in the passband and whose passband is equal to the range of uncertainty as to the frequency $Nf_0$ and centered on that range.

In one embodiment, the filter whose characteristic has steep flanks and a flat top in the passband is a Hermite filter.

In one embodiment, to determine the value of the frequency corresponding to the maximum of the Fourier transform, the maximum value of the derivative of the square of the modulus of the Fourier transform and the value of the frequency for which that derivative is zero are determined.

In one embodiment, the frequency corresponding to the maximum of the Fourier transform is determined by determining the frequency for which the following quantity D is zero:

$$D = Im[FFT(Z_t) \cdot FFT^*(tZ_t)] \quad (6)$$

In the above equation, $Z_t$ represents the complex value of a sampled signal, $FFT(Z_t)$ the Fourier transform of that signal, $FFT^*(tZ_t)$ the conjugate value of the transform $tZ_t$ of the signal, t time and Im the imaginary part of the complex number between the square brackets.

In one embodiment, the detected signal is also amplitude-modulated.

The invention further provides an application of the method to transmitting radio signals.

BRIEF DESCRIPTION OF THE DRAWINGS

Other features and advantages of the invention become apparent from the following description of embodiments of the invention, which is given with reference to the accompanying drawings, in which.

MORE DETAILED DESCRIPTION

Figure 1:
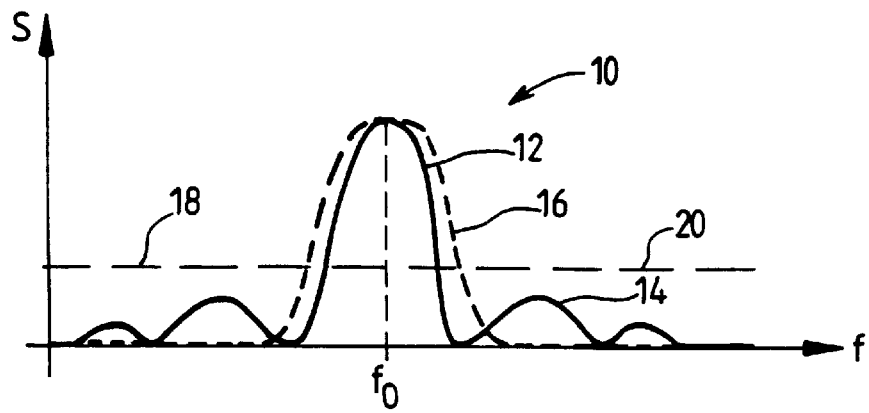
FIG. 1 is a diagram showing conventional Nyquist filtering effected before multiplying the phase of the received signal by N.

The FIG. 1 diagram shows the spectrum of the received signal, i.e. a curve 10 of the variation in the amplitude S of the signal as a function of frequency. Because the received signal is not a pure frequency, it has a center line (or main lobe) 12 which is relatively broad and is centered on the frequency $f_0$ of the carrier and secondary lobes 14 on respective opposite sides of the center line 12.

Nyquist filtering represented by the curve 16 is applied to reduce noise. A Nyquist filter is a bandpass filter centered on $f_0$. It eliminates the noise 18, 20 outside the passband of the signal.

Figure 2:
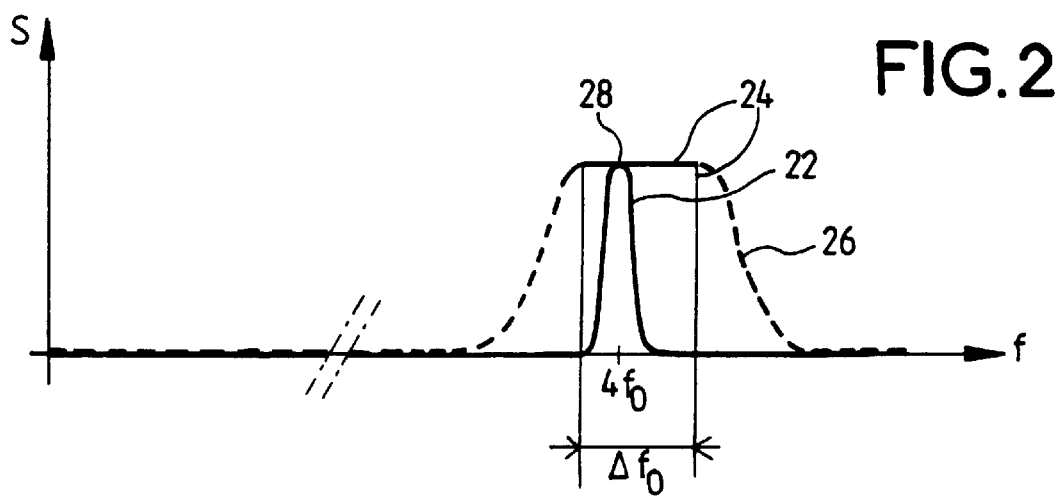
FIG. 2 is a diagram showing filtering in accordance with one aspect of the invention.

After this filtering, the phase of the signal is multiplied by the number N of symbols, i.e. by 4 in this example. A pure frequency signal centered on $4f_0$ is then obtained. The curve 22 in the FIG. 2 diagram shows this spectrum.

In the first aspect of the invention, the signal is filtered using a filter whose characteristic has steep flanks and a passband whose width is equal to the range $\Delta f_0$ of uncertainty as to the frequency $4f_0$ and is centered in that range. This filter whose characteristic has steep edges is represented by the rectangular signal 24 in the FIG. 2. It eliminates further noise.

The noise eliminated is residual noise remaining after Nyquist filtering and additional noise occasioned by multiplying the phase by N.

The filter 24 whose characteristic has steep flanks and a flat top in the passband is a Hermite filter, which can be implemented at moderate cost. The particular feature of a Hermite filter is that, for a given number of filter coefficients, it achieves an optimum compromise between the flatness in the passband and the steepness of rejection. Thus using some other type of filter, such as a filter 26 with spread flanks, would render relatively insignificant the improvement over the Nyquist filtering 16 effected during the first step of the method, because this other filter 26 would not have a passband much smaller than that of the filter 16, because of its spread flanks.

The second aspect of the invention consists of determining the maximum 28 of the curve 22 by determining the derivative of the Fourier transform of the input signal z.

To this end, the following quantity D is determined:

$$D = Im[FFT(Z_t) \cdot FFT^*(tZ_t)] \quad (6)$$

The quantity D represents the derivative of the modulus of the Fourier transform of the signal Z. Using complex notation, the value of the Fourier transform of the signal $Z_t$ is:

$$F_\omega[Z(t)] = \frac{1}{\sqrt{2\pi}} \int_{-\infty}^{+\infty} Z(t)e^{-j\omega t} dt \quad (7)$$

The square of the modulus of the Fourier transform is expressed as follows:

$$|F_\omega[Z(t)]|^2 = F_\omega[Z(t)] \cdot F_\omega[Z(t)]^* \quad (8)$$

The derivative of the square of the modulus of the Fourier transform with respect to $\omega$, i.e. with respect to frequency, is therefore written:

$$\frac{d}{d\omega}|F_\omega[Z(t)]|^2 = \frac{j}{2\pi}\left[-F_\omega[Z(t)]^* \int_{-\infty}^{+\infty} tZ(t)e^{-j\omega t} dt + F\omega[Z(t)] \int_{-\infty}^{+\infty} tZ^*(t)e^{j\omega t} dt\right] \quad (9)$$

$$= \frac{j}{2\pi}[F\omega[Z(t)] \cdot F\omega[tZ(t)]^* - F\omega[Z(t)]^* \cdot F\omega[tZ(t)]]$$

$$= \frac{j}{2\pi}\operatorname{Im}[F\omega[Z(t)] \cdot F\omega[tZ(t)]^*]$$

Accordingly, the derivative of the square of the modulus of the Fourier transform is zero when:

$$Im[F_\omega[Z(t)] \cdot F_\omega[tZ(t)]^*] = 0 \quad (10)$$

It can be shown that this imaginary part of the product of the Fourier transform of the signal $Z_t$ by the conjugate Fourier transform $tZ_t$ of the signal is optimum for the estimation accuracy. This is because:

At a time t, a sample subject to noise has the following value:

$$Z_t = A \exp j(\omega t + \psi) + n_t,$$

where $$\langle n_t n_{t'}^* \rangle = 2\sigma^2 \delta_{tt'},$$

where $n_t$ is the noise and $\delta_{tt'}$ is the Dirac function such that $\delta_{tt'} = 1$ if $t = t'$ and $\delta_{tt'} = 0$ if $t \neq t'$.

The weighted least squares method consists of seeking values of the parameters A, $\psi$ and $\omega$ which minimize the following quadratic equation in G:

$$G \sum_t n_t n_{t'}^* = \sum_t [Z_t - A\exp j(\omega t + \varphi)][Z_t^* - A\exp - j(\omega t + \varphi)]$$

Nulling the partial derivatives of this expression relative to the parameters A, $\psi$ and $\omega$ yields:

$$\partial_A \Rightarrow A = \frac{1}{l}\Re\left[\sum_t Z_t \exp - j(\omega t + \varphi)\right],$$

l being the number of complex samples and $\Re$ signifying the real part of the number between square brackets.

$$\partial_\varphi \Rightarrow -e^{-j\varphi}\sum_t Z_t \exp - j\omega t + e^{j\varphi}\sum_t Z_t^* \exp j\omega t = 0.$$

$$\partial_\omega \Rightarrow -e^{-j\varphi}\sum_t tZ_t \exp - j\omega t + e^{j\varphi}\sum_t tZ_t^* \exp j\omega t = 0$$

Eliminating $\psi$ from the last two equations yields:

$$\left(\sum_t Z_t \exp{-j\omega t}\right)\left(\sum_t Z_t^* \exp{j\omega t}\right) - \left(\sum_t tZ_t^* \exp{j\omega t}\right)\left(\sum_t Z_t \exp{-j\omega t}\right) = 0$$

For the exact value of $\omega$, the product of the Fourier transform of $tZ_t$ by the inverse Fourier transform of $Z_t^*$ is a real number. The best estimate is obtained by taking the time origin so that $\Sigma_t t = 0$. The estimator is therefore written as follows:

$$Im[F\omega(Z_t)F_\omega^*(tZ_t)] = 0$$

To evaluate the variance, and therefore the accuracy, of the estimator of $\omega$, the total derivative of the estimation equation is taken and the mathematical esperance $<d\omega^2>$ is calculated, treating the differential elements $dz_t$ and $dz_t^*$ as noise $n_t$ and $n_t^*$ and assuming that one is near the true value. With:

$$Z_t = A \exp j(\omega t + \psi); \Sigma t Z_t \exp{-j\omega t} = 0,$$

Furthermore, with $$\Sigma t^2 Z_t \exp{-jt} = A e^{j\alpha} \Sigma t^2$$

and $$\Sigma_0^{N-1} Z_t^* e^{j\omega t} = NA e^{-j\psi},$$

we obtain:

$$jd\omega = \frac{\left(\left(\sum t d z_t \exp{-j\omega t}\right)\left(\sum z_t^* \exp{j\omega t}\right) - \left(\sum t d z_t^* \exp{j\omega t}\right)\left(\sum z_t \exp{-j\omega t}\right)\right)}{\left(\left(\sum t^2 z_t \exp{-j\omega t}\right)\left(\sum z_t^* \exp{j\omega t}\right) + \left(\sum t^2 z_t^* \exp{j\omega t}\right)\left(\sum z_t \exp{-j\omega t}\right)\right)}$$

$$v = <d\omega^2> \geq \frac{\left\langle \sum_t t^2 [dz_t \exp{-j(\omega t + \varphi)} - dz_t^* \exp{j(\omega t + \varphi)}]^2 \right\rangle}{(2\sum t^2)^2 a^2} = \frac{1}{(\sum t^2)} \times \frac{\sigma^2}{a^2}$$

When $\omega$ has been estimated, $\psi$ can be estimated, and then A can be estimated.

Because accuracy is optimized, the carrier frequency of signals having a low signal-to-noise ratio can be estimated.

What is claimed is:

1. A method of estimating the carrier frequency of a phase-modulated digital signal with N states representing N symbols, which method includes:

preliminary filtering of the received signal, multiplying the phase of the received signal by the number N, or a multiple thereof, computing the Fourier transform of the received signal with its phase multiplied N, or by a multiple of N, and determining the frequency for which the Fourier transform is maximum, wherein, to determine the value of the frequency corresponding to the maximum of the Fourier transform, the maximum value of the derivative of the square of the modulus of the Fourier transform and the value of the frequency for which that derivative is zero are determined.

2. A method according to claim 1, wherein the frequency corresponding to the maximum of the Fourier transform is determined by determining the frequency for which the following quantity D is zero:

$$D = Im[FFT(Z_t) \cdot FFT^*(tZ_t)]$$

$Z_t$ representing the complex value of a sampled signal, $FFT(Z_t)$ the Fourier transform of that signal, $FFT^*(tZ_t)$ the conjugate value of the transform $tZ_t$ of the signal, t time, and Im the imaginary part of the complex number between the square brackets.

3. A method according to claim 1, wherein the signal detected is also amplitude-modulated.

4. A method of estimating the carrier frequency of a phase-modulated digital signal with N states representing N symbols, said signal also being amplitude modulated, which method includes:

preliminary filtering of the received signal, multiplying the phase of the received signal by the number N, or by a multiple thereof, after said multiplication, additional filtering by a filter whose characteristic has steep flanks and a flat top in the passband and whose passband is equal to the range of uncertainty as to the frequency $Nf_o$ and centered in that range, after said additional filtering, computing the Fourier transform of the received signal whose phase has been multiplied by N, or by a multiple of N, and determining the frequency for which the Fourier transform is maximum.

5. A method according to claim 4, wherein the filter whose characteristic has steep flanks and a flat top in the passband is a Hermite filter.

6. A method according to claim 4, wherein, to determine the value of the frequency corresponding to the maximum of the Fourier transform, the maximum value of the derivative of the square of the modulus of the Fourier transform and the value of the frequency for which that derivative is zero are determined.

7. A method according to claim 6, wherein the frequency corresponding to the maximum of the Fourier transform is determined by determining the frequency for which the following quantity D is zero:

$$D = Im[FFT(Z_t) \cdot FFT^*(tZ_t)]$$

$Z_t$ representing the complex value of a sampled signal, $FFT(Z_t)$ the Fourier transform of that signal, $FFT^*(tZ_t)$ the conjugate value of the transform $tZ_t$ of the signal, t time, and Im the imaginary part of the complex number between the square brackets.

8. An application of the method according to claim 1 to transmitting radio signals.

* * * * *